United States Patent
Kawazu

[11] 3,932,046
[45] Jan. 13, 1976

[54] PIPE-CONNECTING DEVICE AND PIPES
[76] Inventor: Takashi Kawazu, No. 10-4, 5-chome, Nakano-cho, Miyakojima, Osaka, Osaka, Japan
[22] Filed: Oct. 29, 1974
[21] Appl. No.: 518,462
[22] Filed: Oct. 29, 1974
[21] Appl. No.: 518,462

[52] U.S. Cl. ............... 403/172; 403/402; 403/295
[51] Int. Cl.² ............................................ F16B 7/00
[58] Field of Search .......... 403/219, 171, 172, 176, 403/170, 173, 174, 295, 293, 292, 402; 52/758 H

[56] References Cited
UNITED STATES PATENTS

| | | | |
|---|---|---|---|
| 3,294,429 | 12/1966 | Halip | 403/295 |
| 3,627,359 | 12/1971 | Paul | 52/758 H |
| 3,749,432 | 7/1973 | Janssen | 403/292 X |
| 3,765,541 | 10/1973 | Madey et al. | 403/171 X |

FOREIGN PATENTS OR APPLICATIONS
1,192,293  5/1970  United Kingdom ............... 403/402

Primary Examiner—Andrew V. Kundrat
Attorney, Agent, or Firm—George B. Oujevolk

[57] ABSTRACT

A pipe-connecting device and pipes connected thereto. This connecting device comprises a base portion and an indefinite number of plate-like inserting members projecting therefrom in any directions, said inserting members each having a width wide enough for making pressed contact with a pipe at its inside periphery. The inserting member is provided at its longitudinal side edges with a pressing portion so as to insert the inserting member pressingly in the pipe thereby connecting the two in such a way that one can not be slipped off from the other.

3 Claims, 11 Drawing Figures

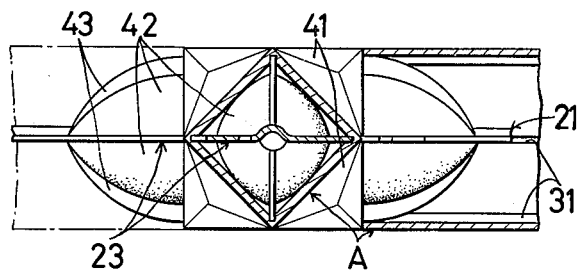
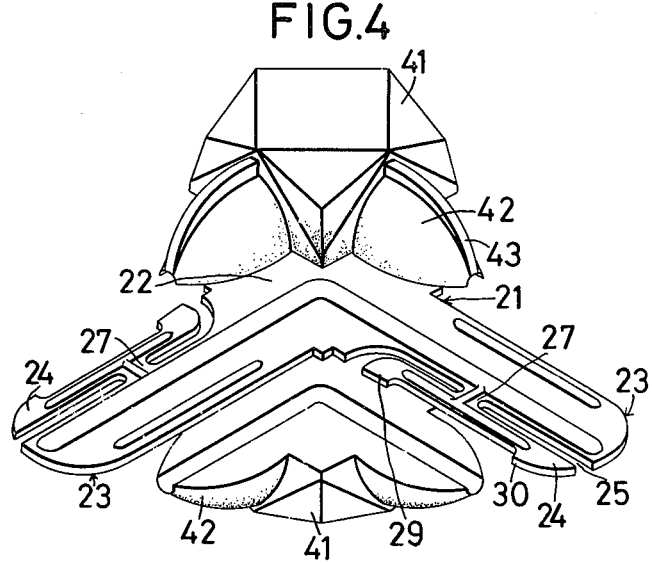
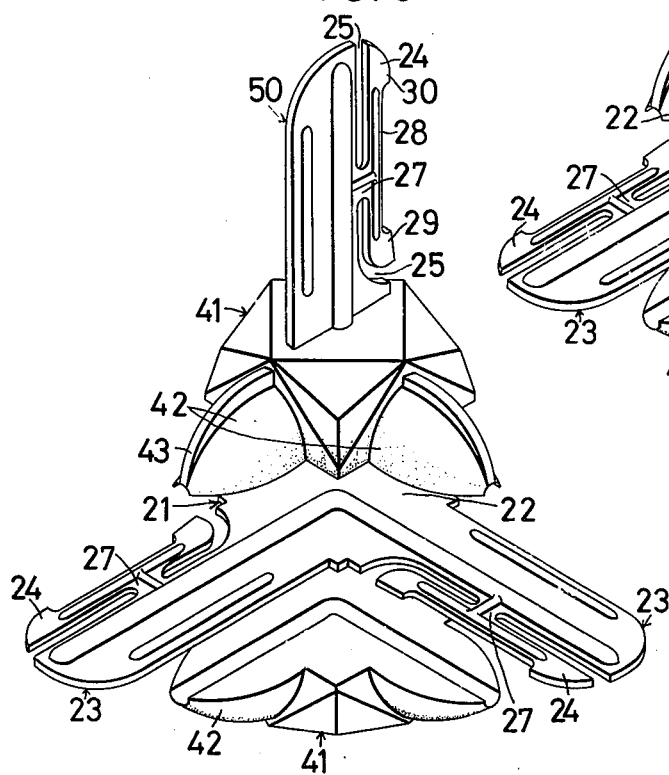
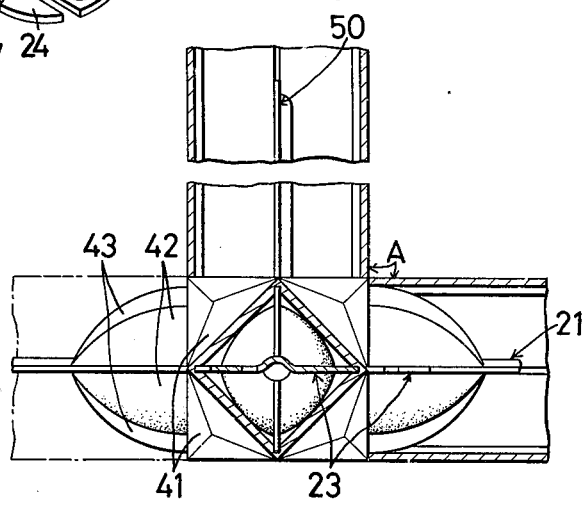

PIPE-CONNECTING DEVICE AND PIPES

The present invention relates to a pipe-connecting device and pipes for connecting thereto, said device comprising a base-portion and a plural number of plate-like inserting members projecting therefrom, said inserting members fitting firmly into said pipes at their end portions thereby forming either a plane or a vertical frame of pipes by means of their stable unification via said device.

A first object of this invention is to provide a pipe-connecting device for connecting pipes therewith firmly in a simple operation, and also forming pipes fittable thereto.

A second object of this invention is to provide a device for making pipe connections either horizontally or vertically in any directions.

A third object of this invention is to provide a device for connecting pipes by a fitting at their connecting portions.

A fourth object of this invention is to provide a pipe-connecting device which can be mass produced at low cost with a simple manufacturing process such as punching and the like being applicable thereto.

A fifth object of this invention is to provide pipes which can be further connected to other pipe-like members via the device contemplated.

These objects can be accomplished by the improvement, combination and operation of the parts constituting this invention, the preferred embodiment of which will be apparent in the following detailed description and the annexed drawing in which:

FIG. 3 is a longitudinal front view of the embodiment of FIG. 2.

FIG. 4 is a perspective view of the inventive concept in a disassembled or exploded view showing pipes connecting in two directions in the second embodiment.

FIG. 5 is a perspective view of the inventive concept in a disassembled or exploded view in a third embodiment.

FIG. 6 is a longitudinal front view of the inventive concept showing pipes in connecting arrangement in the third embodiment.

Figure 1:
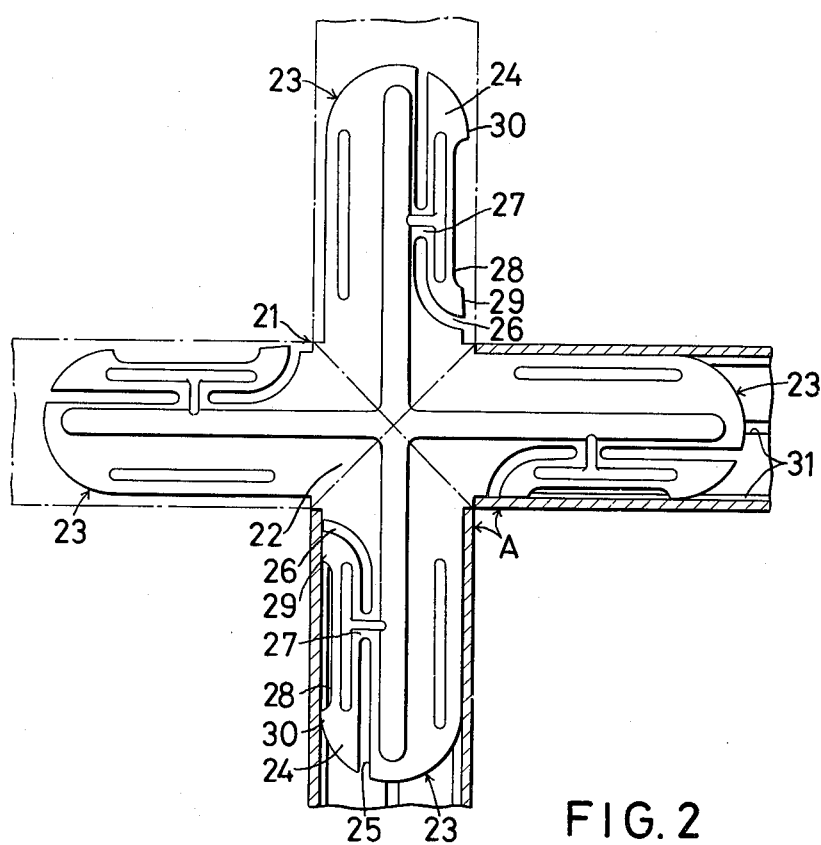
FIG. 1 is a sectional plan view of the inventive concept in a first embodiment wherein pipes are shown in a single plane.
Figure 2:
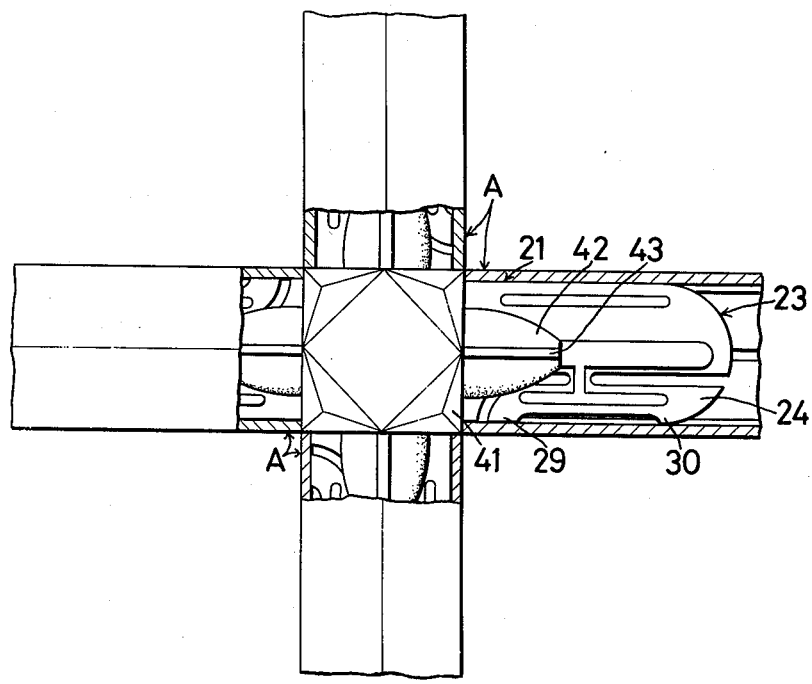
FIG. 2 is a sectional plan view of the invention in a second embodiment also showing a connecting arrangement for pipes.

In FIGS. 1 and 2, numeral 21 designates the pipe-connecting device proper, called "connector" hereinunder, said connector 21 comprising a base portion 22 and an indefinite number of inserting members 23 projecting in any directions therefrom.

Figure 7:
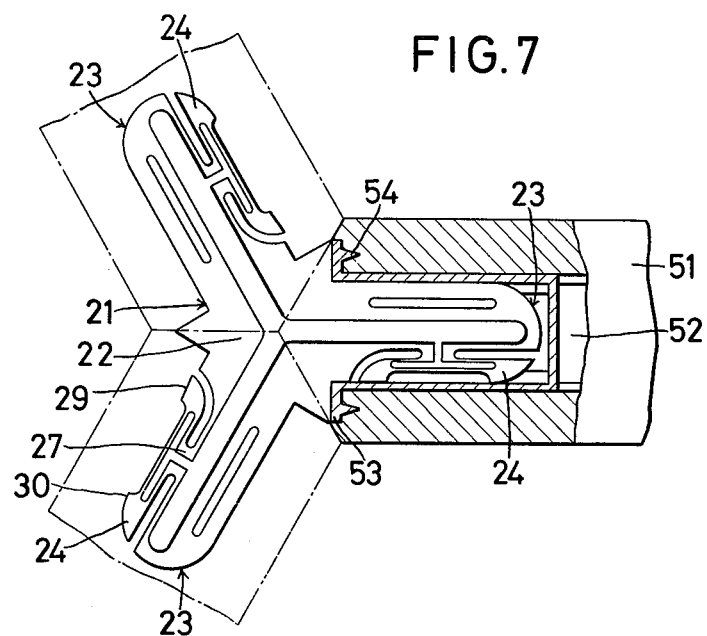
FIG. 7 is a sectional plan view of the inventive concept showing pipes in connecting arrangement in a fourth embodiment.

In case of FIG. 1 the connector proper 21 comprises four inserting members 23 projecting in four directions thereby enabling connections for four pipes at four sides. Among other forms are connection of two pipes forming a right angle as shown in FIGS. 4 and 5, connection of three pipes forming a trio of equal angles as shown in FIG. 7, otherwise a (not shown) straight connection of two pipes, connection of three pipes forming right angles and the like.

The connector 21 made of a suitably thick metal plate comprises the base portion 22 and inserting members 23 combined therewith, said construction being done easily by means of punching and the like.

The inserting member 23 measures a predetermined length ranging to the free tip thereof from the base portion 22 so as to be suitably fitted into a pipe A, also said inserting member 23 has a predetermined width slightly wider than the inside diameter of the pipe A so that said inserting member 23 can make a pressing contact in a bent state with the pipe A at its inside periphery.

The inserting member 23 forms at one of longitudinal sides thereof a pressing portion 24, said pressing portion 24 being spaced from the inserting member 23 but linking therewith via a bridge 27, said space being provided by the longitudinal formation of two notches 25 and 26 so as to abut on each other across said bridge 27 on said side of the inserting member 23. In this construction, the metallic pressing portion 24 has a slight elasticity relative to the inserting member proper 23, said elasticity making it possible to bend said pressing portion 24 to some extent via said bridge 27 at the application of a pressure thereto thereby the inserting member 23 to make a forced entrance into pipe A despite the measuring inconsistency between the two as mentioned hereinbefore with the result that said inserting member 23 makes a pressing contact with the pipe A at its inside periphery and accordingly being firmly seated therein.

Said pressing portion 24 is further provided at the outside edges thereof with a longitudinal recessed groove 28 intermediately and at both ends thereof forming projections 29 and 30 for additionally preventing the pressing portion 24 from sliding off from said pipe A.

The inserting member 23 measures widest at the tip of the projection 29 which abuts against the base portion 22, said tip of the projection 29 having a horizontal, outward slight arcuate shape so as to facilitate the insertion of inserting member 23 into pipe A.

The connector 21 further is provided with ribs from the base portion 22 to each of the inserting members and also at the bridge 27 and along the pressing portion 24 as a means of durability reinforcement against bending.

Figure 9:
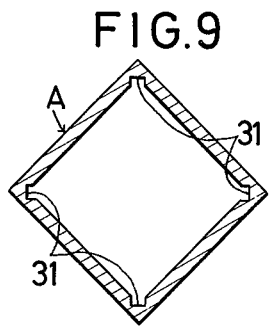
FIGS. 9 to 11 show a variety of sectional forms of pipes available for connection with the invention device herein contemplated.

Shown in FIG. 9, that sectionally square pipe A forms a concave groove 31 in axial direction at every corner on the inside periphery thereof. When inserting said inserting member 23 in the square pipe A, the inserting member 23 at both sides thereof fits diagonally in said concave grooves 31. In this case, needless to mention, the distance between the innermost edges of the diagonally situating grooves 31 corresponds to the inside diameter of a sectionally-round pipe A as referred to hereinbefore.

Figure 10:
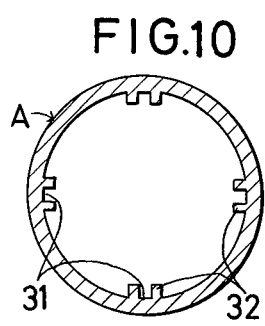
Figure 11:
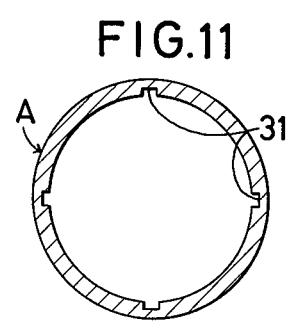

Sectionally-round pipe A is shown in FIGS. 10 and 11. In case of FIG. 11, a quadruplet of the concave grooves 31 as in case of the above square pipe are formed axially on the inside periphery thereof keeping equal intervals in between each other.

In case of FIG. 10 as many number of said grooves 31 are arranged in the same manner as the foregoing but differing from the above in that said groove 31 is formed by two projections 32 instead of recesses on the inside surface.

The pipes A abuts fittingly on each other at their terminal portions in the state of their connection to the connector 21 so that they cover the entirety of said base portion 22 in the first embodiment.

The connection of pipes A to the connector 21 is executed in the first embodiment as below:

As referred to already hereinbefore, the inserting member 23 at both sides thereof fits in the pipe A at the recess grooves 31 thereof, in this insertion said pressing portion 24 at said projections 29 and 30 thereof having a metallic elasticity relative to said inserting member 23 via said bridge 27 thereby pressing the projections 29 and 30 forcibly against the pipe A at the innermost wall of said recess grooves 31 thereof thereby enabling to stably fix the inserting member 23 in the pipe A.

The pipe-connection is complete in the state that each of the pipes A at their end portions abut fittingly against each other so that they cover said base portion 22 and accordingly the connector 21 at the entirety thereof.

The pipe A can be separated from the connector 21 easily by means of pulling it therefrom simultaneously swinging it widewise.

The second embodiment is illustrated in relation with FIGS. 2 to 4 wherein components equivalent with those in FIG. 1 in construction and function will have the same numerals but omitted from the explanation.

Each of the four pipes A in the second embodiment forms vertically-cut sections at their terminal on the side of the base portion 22 thereby leaving the base portion 22 uncovered. To prevent said uncovered portion in a square from presenting a somewhat ridiculous appearance it is necessary to prepare an ornamental member to cover said square portion, said ornamental member being designated by numeral 41 in FIGS. 2 to 4. For the above purpose, two ornamental members 41 are used for covering said square portion on the back and front surface thereof.

The ornamental member 41 at its side abuts on the inserting member 23 thereby closing the pipe A at the opening terminal thereof simultaneously forming a projection 42 thereon in such a way that said projection 42 tapers at its free forward end and becomes flat at its surface thereby laying flat over said inserting member 23. In this formation, said ornamental member 41 is prearranged so as to fit pressingly at the projection 42 thereof in the pipe A with the insertion of said inserting member 23 therein as mentioned hereinbefore, thereby fixing said ornamental member 41 to the connector 21 in a stabilized state. The projection 42 is provided with an additional projection 43 thereon at its arcuate outer periphery, said projection 43 fitting in said recess groove 31 inside the pipe A thereby adding further to the stability of said ornamental member 41 settling down therein.

Needless to say, the ornamental member 41 varies in number and projecting direction to accord with the kinds of the inserting members 23.

How to connect pipes in the second embodiment follows:

The ornamental member 41 formed so as to fit on the connector 21 is put on the base portion 22 of the plate-like inserting members by engaging a recess in the ornamental member with a corresponding rib-like projection extending the length of the connector at both back and front surfaces thereof. In this state, the inserting member 23 is inserted into the pipe A so as to fit at both sides thereof in the recess grooves 31 formed in opposite direction inside said pipe A and said projections 43 of the ornamental member 41 fit in the other confronting recess grooves 31 inside the same pipe A.

As the inserting member 23 enters into said pipe A until said pipe A at its terminal abuts against the ornamental member 41 at the side thereof, the foregoing uncovered base portion 22 is totally covered by said ornamental member 41 as shown in FIGS. 2 and 3.

In this case also the pipe connection can be stabilized by means of the pressing portion 24 in the same manner as mentioned hereinbefore.

Illustration on the third embodiment in relation with FIGS. 5 and 6 follows, wherein components having similar structure and functions as those in the foregoing embodiments will be omitted from explanation but designated with identical numerals.

In the third embodiment, the ornamental member 41 is provided at the outer side thereof with an inserting member 50 projecting therefrom so as to vertically connect pipes via said ornamental member 41. As shown in FIG. 5 in this embodiment, said ornamental member 41 can be disposed so as to accomodate three pipes, i.e., act on three sides as a pipe-connection or as a hexagonal connection (not shown) by both changing the structure of ornamental member 41 to accomplish the foregoing effect and to the manner of the combination of said ornamental member 41 with said connector 21.

Inserting member 50, with the insertion member 23 is fixed to ornamental member 41 by means of screws.

How to connect pipes with this connector in the third embodiment:

For connecting pipes A with the connector 21, in the third embodiment, each one of said ornamental members 41 is disposed over the base portion 22 at both surfaces thereof prior to the connection of pipes, as mentioned already hereinbefore, when either one of the ornamental members 41 is used with inserting member 50, pipes A can be vertically connected in the same manner as the second embodiment thereby obtaining pipes in a frame as shown in FIG. 6.

Figure 8:
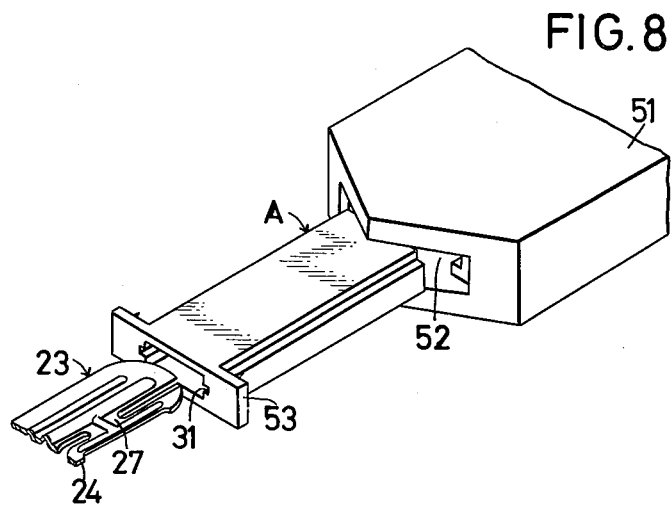
FIG. 8 is a perspective view showing the main parts of FIG. 7 in a disassembled or exploded view.

In the fourth embodiment given below in relation with FIGS. 7 and 8, components bearing the same numerals as in the foregoing embodiments will be omitted from illustration also.

In this embodiment, each of the pipes A connected to the connector 21 also plays the role of a connector for connection to other pipe-like structures 51 such as a rectangular piece of lumber and the like. In this case, said pipe A has a flat rectangular aperture having a dimension sized so as to fit inserting member 23, said pipe A having a recess groove on both of the inner side walls thereof 31 for receiving inserting member 23 to fit therein.

The pipe A fixes to the pipe-like structure 51 by fitting in a recess 52 provided in said structure 51 and further said pipe A at the base terminal thereof has a flange 53 on which is provided a sharp projection for punching into said pipe-like structure like a pin 51. Said pipe-like structure 51 are so formed at their end portions so as to fit on the base portion 22 in such a manner as to closely contact each other and accordingly covering the base portion 22 as shown in.

In this case, said pipe A is preferably fitted in said pipe-like structure 51 in its recess 52 before inserting said inserting member 23 in pipe A.

I claim:

1. A pipe-connecting device with an elongated insert for connecting pipes by inserting the insert so the longitudinal edges thereof enter corresponding grooves (31) in the pipes, comprising in combination: an elongated flat inserting member (23) having a straight edge with an inner base (22) and a rounded far end; a flat pressing portion (24) separated therefrom but linked thereto by a bridge (27), said bridge forming a straight elongated notch (25) towards said rounded far end and an outwardly curved notch (26); a longitudinal recessed groove (28) towards the rounded far end, towards the inner base, and in the intermediate portion of said pressing portion (24) forming an outer projection (30) and an inner projection (29) of slightly arcuate shape towards the outer tip thereof disposed next to said base (22), said member (23) being widest at the portion having said tip; and a reinforcing rib extending from said base along said inserting member, whereby, said inserting member (23) can be forcefully inserted into a pipe of slightly smaller diameter, by sliding the straight edge on one side and the inner and outer projections (29, 30) on the other side into the corresponding grooves (31) in the pipe, said bridge (27) and notches (25, 26) providing resiliency to the inserting member (23) firmly engaging said pipe, said inner and outer projections (29, 30) preventing the engaged pipe from sliding off said member (23).

2. A pipe-connecting device as claimed in claim 1, including an ornamental cover sized to fit over said base (22) by engaging said reinforcing rib.

3. A pipe-connecting device as claimed in claim 2, wherein said ornamental member is adapted to overlap said base, said ornamental member having a projection thereon which fits in the pipe so as to stably attach said ornamental member.

* * * * *